(12) United States Patent
Shiroto

(10) Patent No.: US 10,739,906 B2
(45) Date of Patent: Aug. 11, 2020

(54) OPERATION INPUT DEVICE AND TOUCH PANEL

(71) Applicant: DENSO TEN Limited, Kobe-shi, Hyogo (JP)

(72) Inventor: Hironori Shiroto, Kobe (JP)

(73) Assignee: DENSO TEN LIMITED, Kobe-shi (JP)

( * ) Notice: Subject to any disclaimer, the term of this patent is extended or adjusted under 35 U.S.C. 154(b) by 0 days.

(21) Appl. No.: 16/219,081

(22) Filed: Dec. 13, 2018

(65) Prior Publication Data

US 2019/0212865 A1    Jul. 11, 2019

(30) Foreign Application Priority Data

Jan. 10, 2018 (JP) .................................. 2018-002121
Jan. 10, 2018 (JP) .................................. 2018-002122

(51) Int. Cl.
*G06F 3/041* (2006.01)
*H02N 2/18* (2006.01)
*G06F 3/01* (2006.01)

(52) U.S. Cl.
CPC ............ *G06F 3/0416* (2013.01); *G06F 3/016* (2013.01); *H02N 2/181* (2013.01); *G06F 2203/014* (2013.01)

(58) Field of Classification Search
CPC ........ G06F 3/044; G06F 3/0416; G06F 3/016; G06F 2203/014; H02N 2/181
See application file for complete search history.

(56) References Cited

U.S. PATENT DOCUMENTS

| | | | | |
|---|---|---|---|---|
| 2011/0291976 | A1* | 12/2011 | Takada | .................... G06F 3/016 345/173 |
| 2016/0342269 | A1* | 11/2016 | Endo | ...................... G06F 3/0488 |
| 2018/0003577 | A1* | 1/2018 | Podoloff | ............... G01L 1/2287 |
| 2018/0011565 | A1* | 1/2018 | Nekimken | .............. G06F 1/169 |
| 2018/0024638 | A1* | 1/2018 | Endo | ....................... G06F 3/041 345/173 |
| 2018/0275786 | A1* | 9/2018 | Miyamoto | ................ G06F 3/01 |

FOREIGN PATENT DOCUMENTS

JP         2016-170766 A        9/2016

* cited by examiner

*Primary Examiner* — Premal R Patel
(74) *Attorney, Agent, or Firm* — Oliff PLC

(57) ABSTRACT

An operation input device according to an embodiment includes a substrate, a protection film, and an adhesive agent. The substrate vibrates at an ultrasound frequency, and receives a touch input operation. The protection film is disposed on the substrate on the side of an operation surface. The adhesive agent is provided to a plurality of locations between the substrate and the protection film, and the protection film is bonded to the substrate by the adhesive agent.

6 Claims, 7 Drawing Sheets

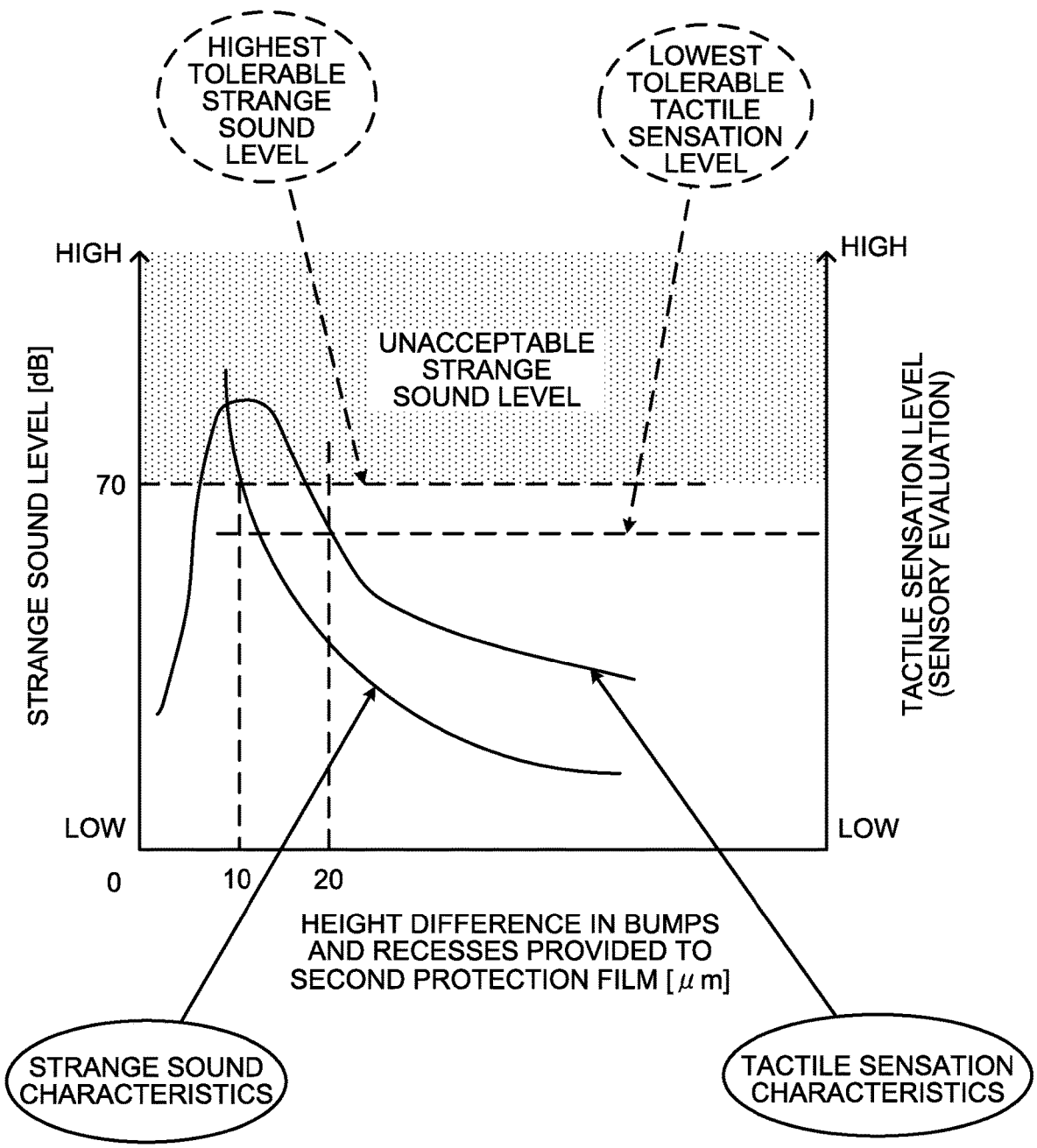

OPERATION INPUT DEVICE AND TOUCH PANEL

CROSS-REFERENCE TO RELATED APPLICATION

This application is based upon and claims the benefit of priority of the prior Japanese Patent Applications No. 2018-002121 and No. 2018-002122, both filed on Jan. 10, 2018, the entire contents of both of which are incorporated herein by reference.

FIELD

The embodiments discussed herein are directed to an operation input device and a touch panel.

BACKGROUND

Having been conventionally available is an operation input device giving a predetermined tactile sensation to the finger tip of a user making a touch operation, by vibrating a touch panel on which the user makes the touch operation at a frequency within the ultrasound range.

An example of a literature related to such a technology includes Japanese Laid-open Patent Publication No. 2016-170766.

However, such an operation input device sometimes emits strange sound due to the interference between the vibrating touch panel and the fingerprint of the finger tip touching the touch panel.

SUMMARY

An operation input device according to an embodiment includes a substrate, a protection film, and an adhesive agent. The substrate vibrates at an ultrasound frequency, and receives a touch input operation. The protection film is disposed on the substrate on the side of an operation surface. The adhesive agent is provided to a plurality of locations between the substrate and the protection film, and the protection film is bonded to the substrate by the adhesive agent.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 9 is an explanatory schematic illustrating a relation between the height difference in the bumps and the recesses provided on a second protection film according to the second embodiment, and the levels of the strange sound and the tactile sensation.

DESCRIPTION OF EMBODIMENTS

Some embodiments of the operation input device and the touch panel according to the present invention will now be explained in detail with reference to the appended drawings. The embodiments described below are, however, not intended to limit the scope of the present invention in any way.

First Embodiment

Figure 1:
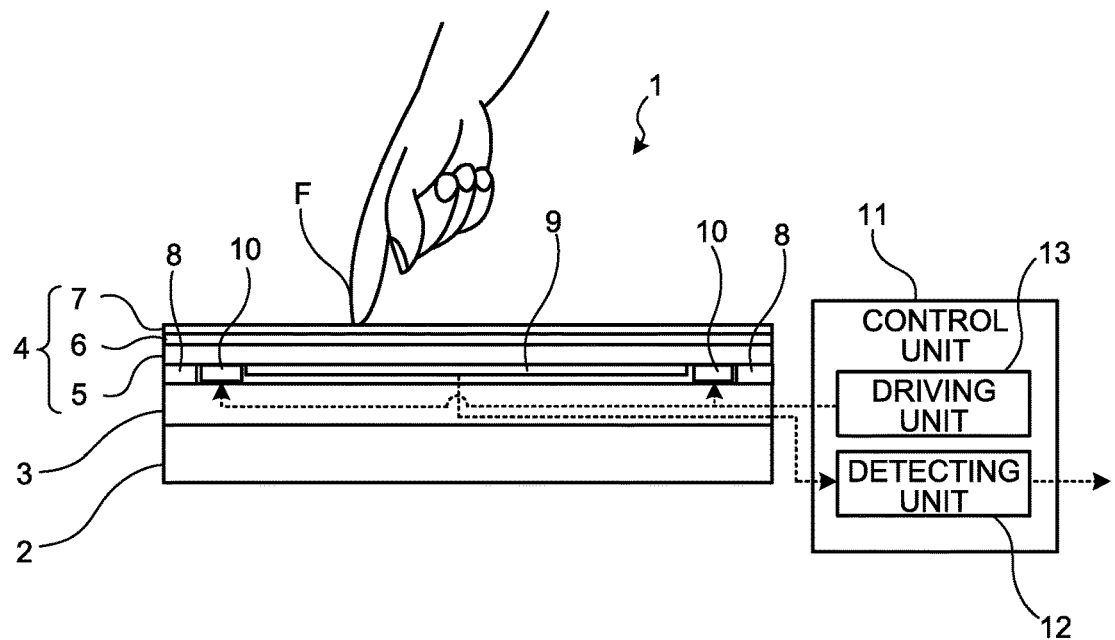
FIG. 1 is an explanatory schematic illustrating an overall configuration of an operation input device according to a first embodiment.

FIG. 1 is an explanatory schematic illustrating an overall configuration of an operation input device 1 according to a first embodiment. For the convenience, in the description below, the side of the operation input device 1 on which touch operations are made by users are explained to be the top. Therefore, in the description below, the upper principal surface of any element included in the operation input device 1 will be referred to as a top surface, and the other principal surface will be referred to as a bottom surface.

As illustrated in FIG. 1, the operation input device 1 includes a display 2, a support plate 3, a touch panel 4, and a control unit 11. The display 2 is a liquid crystal display (LCD), for example, and displays images, such as icons and switches, that are to be touch-operated by a user.

The support plate 3 is provided on the display 2, and is a plate body made of a translucent material such as glass through which the images displayed on the display 2 are visible. The support plate 3 supports the touch panel 4 that is placed on the top surface thereof.

The touch panel 4 is provided on the support plate 3 as an operation unit of the operation input device 1. The touch panel 4 includes a substrate 5, an adhesive layer 6, and a protection film 7 that are sequentially laid on top of one another from the bottom side. The touch panel 4 and the support plate 3 are pasted together with a double-sided tape 8 that is pasted to the peripheral edge of the bottom surface of the substrate 5, for example.

The substrate 5 is a plate body provided on the display 2, and made of a translucent material such as glass through which the images displayed on the display 2 are visible, and also receives a touch operation and a sliding operation made by a user with a finger tip F.

The adhesive layer 6 is made of translucent adhesive agent such as silicone or acrylic by which a protection film is bonded to the operation surface of the substrate 5. The protection film 7 is made of translucent adhesive agent such as polyethylene terephthalate (PET), and protects the operation surface of the substrate 5.

The touch panel 4 includes a touch sensor 9 that is provided to the bottom surface of the substrate 5, and vibrators 10 are provided on outer ends of the bottom surface of the substrate 5 with respect to the touch sensor 9. The vibrators 10 are piezoelectric elements, for example, and vibrate the substrate 5 by being caused to vibrate by a driving signal input from the control unit 11.

The touch sensor 9 is provided with a plurality of electrostatic capacitive pressure sensors that are arranged in the plane direction of the substrate 5, for example. The touch sensor 9 outputs voltage signals based on the electrostatic capacities of the respective electrostatic capacitive pressure sensors to the control unit 11.

The control unit 11 includes a detecting unit 12 and a driving unit 13. The detecting unit 12 determines the position operated by a user on the touch panel 4, based on the signals input from the touch sensor 9. Specifically, with the touch sensor 9, a user operation made on the touch panel 4 causes a change in the electrostatic capacity of an electrostatic capacitive pressure sensor at the position corresponding to the position where the user has made the operation on the operation surface.

Therefore, the detecting unit 12 can determine the position of the electrostatic capacitive pressure sensor in which the electrostatic capacity is changed, as the position where the operation is made on the touch panel 4. The detecting unit 12 then outputs a signal indicating the determined position at which the user operation is made on the touch panel 4 to a target device (not illustrated) that is to be controlled by the operation of the operation input device 1.

The driving unit 13 outputs a driving signal for driving the touch panel 4 to vibrate at a frequency in an ultrasound range (hereinafter, referred to as "ultrasonic vibrations") to the vibrator 10. In this manner, the vibrator 10 is vibrated and causes the touch panel 4 to go through the ultrasonic vibrations, and a squeeze film is formed on the operation surface of the touch panel 4. A squeeze film is a thin layer of the air formed by the air being pulled into between the operation surface and the user's finger tip F due to the ultrasonic vibrations of the touch panel 4. A frequency in the ultrasound range is a high frequency that is generally inaudible to human ears (e.g., 20 kHz or higher), but may be any frequency as long as the squeeze film described above is formed.

By forming such a squeeze film between the operation surface and the finger tip F on the touch panel 4, the frictional resistance on the operation surface is reduced, so that a smooth tactile sensation can be given to the user operating the operation surface with the finger tip F.

However, a general operation input device sometimes generates strange sound when the touch panel vibrates. To address this issue, the touch panel 4 included in the operation input device 1 according to the first embodiment has a structure capable of suppressing the generation of the strange sound caused by the vibration.

Figure 2:
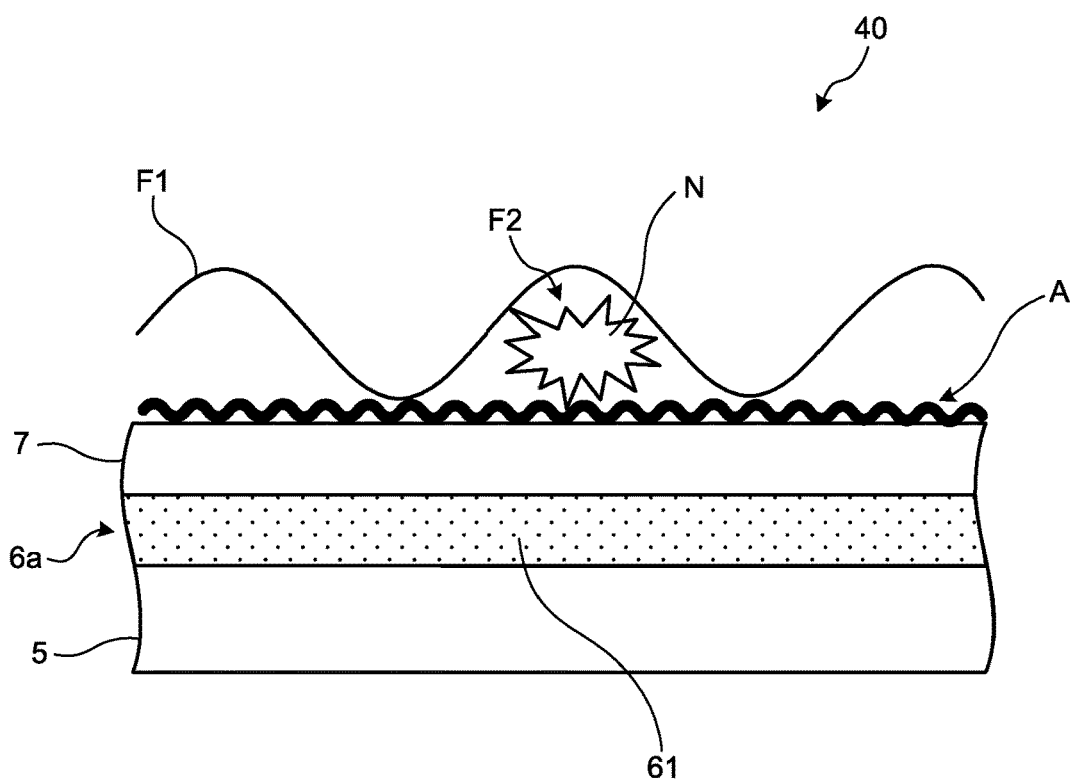
FIG. 2 is an explanatory schematic illustrating a part of a touch panel according to a comparative example in the first embodiment.

To begin with, a principle by which such strange sound is generated by a general touch panel serving as a comparative example will be explained with reference to FIG. 2, and a structure of a touch panel according to the first embodiment will then be explained with reference to FIG. 3. FIG. 2 is an explanatory schematic illustrating a part of this touch panel 40 according to the comparative example in the first embodiment.

Figure 3:
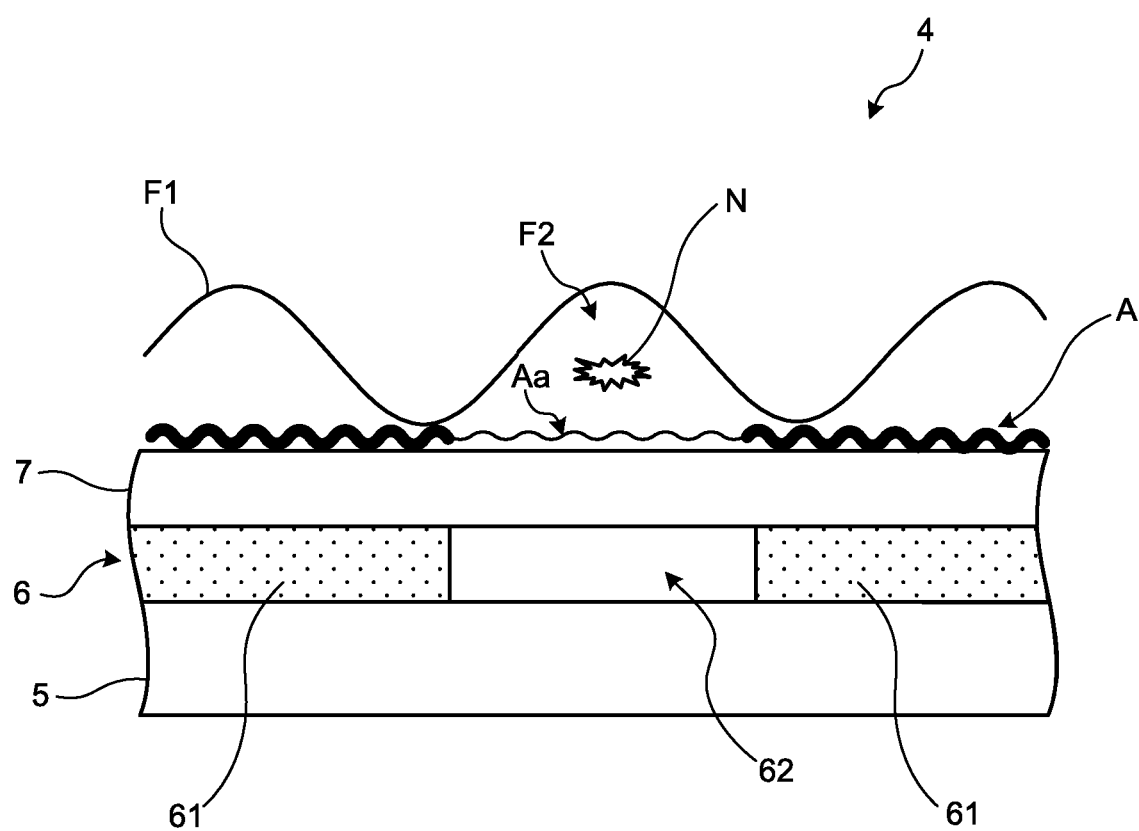
FIG. 3 is an explanatory schematic illustrating a part of a touch panel according to the first embodiment.

FIG. 3 is an explanatory schematic illustrating a part of the touch panel 4 according to the first embodiment. Among the elements illustrated in FIGS. 2 and 3, the elements that are the same as those illustrated in FIG. 1 will be given the same reference numerals as those given in FIG. 1, and detailed explanations thereof will be omitted.

As illustrated in FIG. 2, the touch panel 40 according to the comparative example includes an adhesive layer 6a formed by applying adhesive agent 61 across the entire top surface of the substrate 5, and the protection film 7 is provided to the top surface of the adhesive layer 6a.

In the touch panel 40 according to the comparative example, when the substrate 5 goes through ultrasonic vibrations while a surface F1 of the finger tip F of the user (see FIG. 1) is touching the top surface of the protection film 7, a squeeze film A is formed between the protection film 7 and the surface F1 of the finger tip F.

In this manner, the touch panel 40 according to the comparative example can give a smooth tactile sensation to the user. However, the touch panel 40 according to the comparative example sometimes emits strange sound N from the surface of the protection film 7.

The strange sound N is generated inside of a groove part F2 of the fingerprint on the surface F1 of the finger tip F. Specifically, as illustrated in FIG. 2, in the touch panel 40 according to the comparative example, when the surface F1 of the finger tip F of the user touches the top surface of the protection film 7, a space is formed between the protection film 7 and the groove part F2 of the fingerprint.

In the touch panel 40 according to the comparative example, when the substrate 5 goes through ultrasonic vibrations in this condition, the ultrasound waves emitted from the protection film 7 resonate with the reflected waves of the ultrasound waves reflected on the groove part F2 of the fingerprint, in the space between the protection film 7 and the groove part F2, and the strange sound N is generated thereby.

To address this issue, the touch panel 4 according to the first embodiment suppresses the generation of the strange sound with the structure illustrated in FIG. 3. Specifically, as illustrated in FIG. 3, the touch panel 4 includes the adhesive layer 6 formed by the adhesive agent 61 provided in a manner interspersed on the top surface of the substrate 5, in the plane direction of the operation surface. In this touch panel 4, the area between the substrate 5 and the protection film 7 without the adhesive agent 61 serves as an air passage 62 that is communicated with the outside of the adhesive layer 6.

With this structure, in the areas above the adhesive agent 61, when the substrate 5 in the touch panel 4 goes through ultrasonic vibrations, the ultrasonic vibrations of the substrate 5 are directly communicated to the protection film 7 via the solidified adhesive agent 61.

Therefore, in the area above the adhesive agent 61, the squeeze film A vibrating at the same vibration intensity as the squeeze film A formed in the touch panel 40 according to the comparative example is formed on the protection film 7.

By contrast, in the area above the air passage 62, the ultrasonic vibrations of the substrate 5 are weakened by the air in the air passage 62, and communicated to the area of the protection film 7. Therefore, a squeeze film Aa vibrating at a lower intensity than that squeeze film A formed by the touch panel 40 according to the comparative example is formed on the area above the air passage 62, in the protection film 7.

Hence, in the area of the protection film 7 above the air passage 62, the touch panel 4 can reduce the strange sound N resultant of the resonance between the ultrasound waves emitted from the protection film 7 and the reflected waves of the ultrasound waves reflected on the groove part F2 of the fingerprint at the finger tip F. Therefore, the operation input device 1 can suppress the generation of the strange sound N resultant of the vibration of the touch panel 4.

Figure 4:
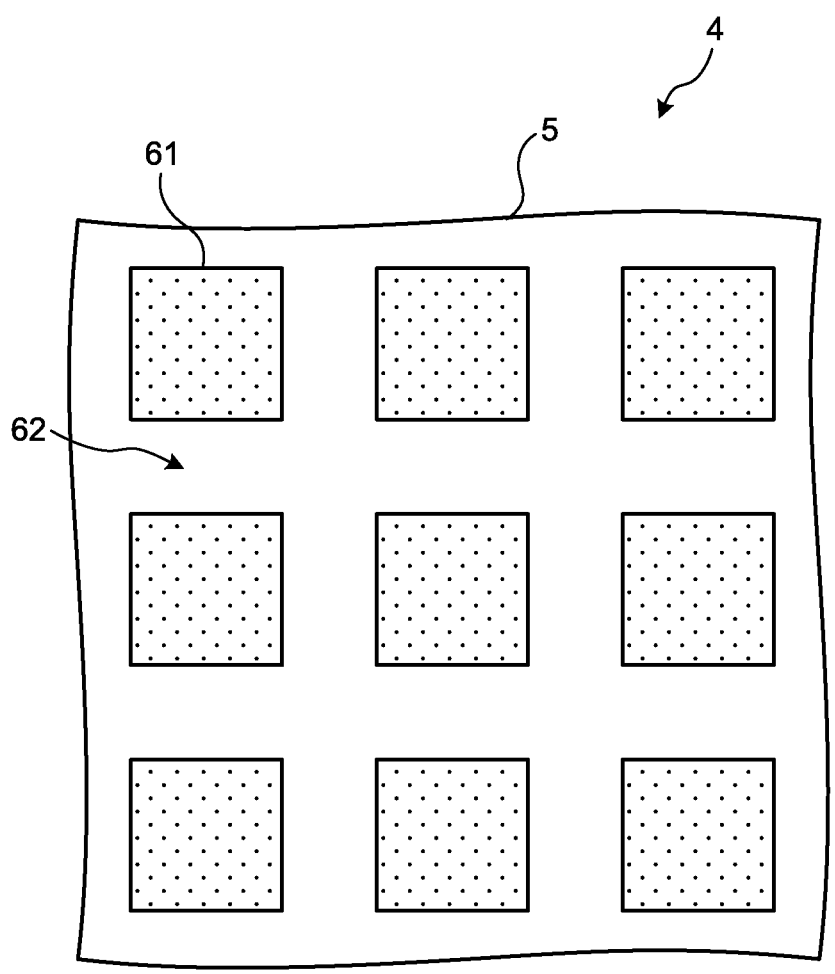
FIG. 4 is an explanatory schematic illustrating an example of the layout of adhesive agent according to the first embodiment.

An example of the layout of the adhesive agent 61 on the substrate 5 according to the first embodiment will now be explained with reference to FIG. 4. FIG. 4 is an explanatory schematic illustrating an example of the layout of the adhesive agent 61 according to the first embodiment. In FIG. 4, a part of the touch panel 4 on the side facing the operation surface is illustrated, with the protection film 7 removed.

As illustrated in FIG. 4, the adhesive agent 61 is provided to the top surface (operation surface) of the substrate 5 in an interspersed manner. Therefore, the air passage 62 patterned by the adhesive layer 6 is communicated with the outside of the adhesive layer 6. With this structure, because the ultrasonic vibrations of the substrate 5 are weakened by the air in the air passage 62 before being communicated to the area above the air passage 62 in the protection film 7, as described above, the operation input device 1 can suppress the generation of the strange sound caused by the vibration of the touch panel 4.

Each piece of the adhesive agent 61 has a square shape with the same size each side of which has a length of 1 millimeter or so, in the plan view. These pieces of the adhesive agent 61 are provided in a manner interspersed across the substrate 5, and in a manner distributed evenly in the plane direction of the operation surface. As a result, the air passage 62 is patterned in a grid-like shape having a constant pitch.

In this manner, even when the refractive index of the adhesive agent 61 is somewhat different from that of the air in the air passage 62, for example, the operation input device 1 enables the image displayed on the display 2 to appear as having a uniform transmittance as a whole, when users perceive the image through the touch panel 4.

Figure 5:
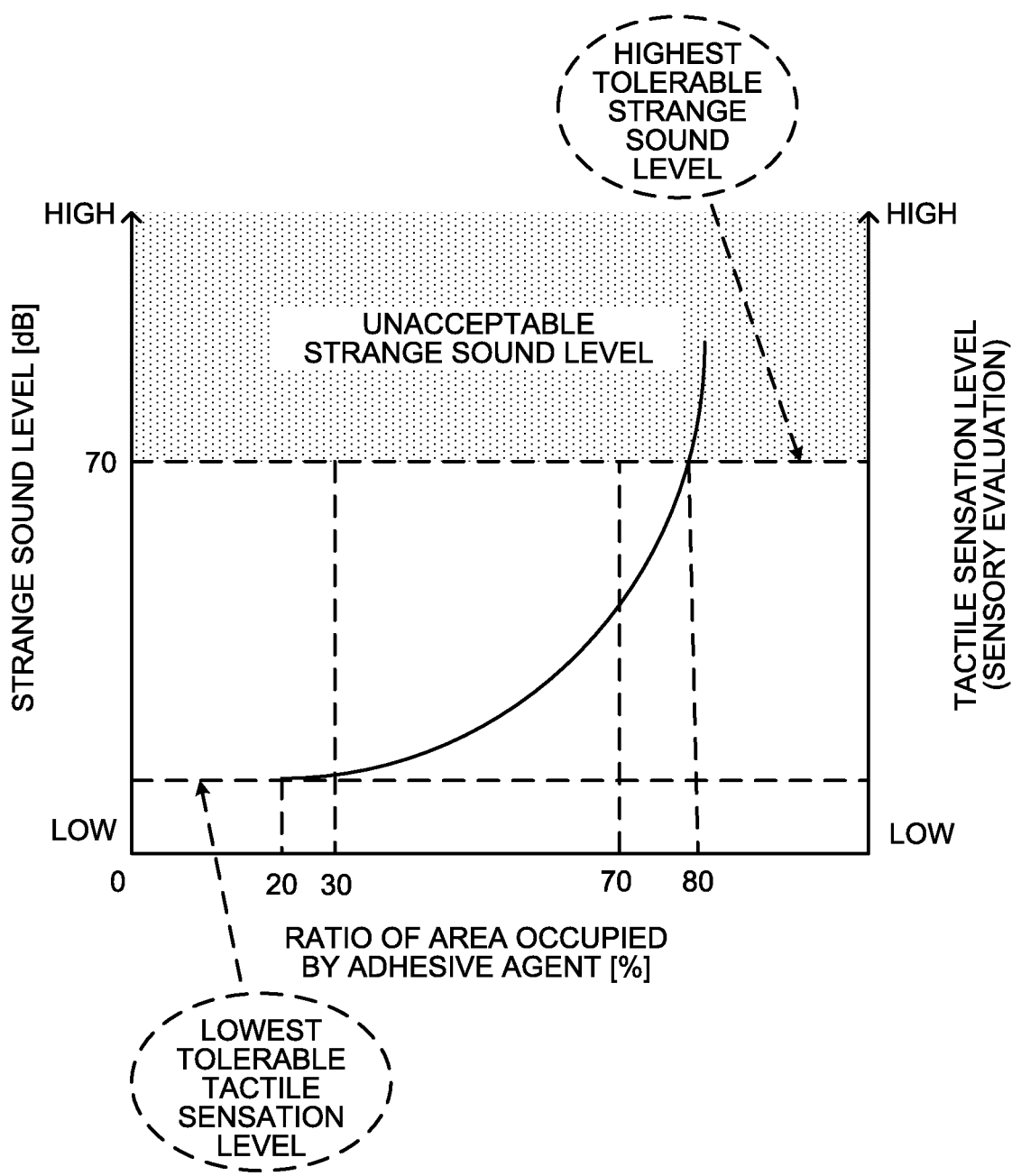
FIG. 5 is an explanatory schematic illustrating a relation between the ratio of the area occupied by the adhesive agent, and the levels of the strange sound and the tactile sensation according to the first embodiment.

A ratio of an area occupied by the adhesive agent 61 on the top surface of the substrate 5 will now be explained with reference to FIG. 5. FIG. 5 is an explanatory schematic illustrating a relation between the ratio of the area occupied by the adhesive agent according to the first embodiment, and the levels of the strange sound and the tactile sensation.

The horizontal axis of the graph illustrated in FIG. 5 represents a ratio of the area occupied by the adhesive agent (%). The left vertical axis represents the strange sound level (dB), and the right vertical axis represents the level tactile sensation (sensory evaluation). The ratio of the area occupied by the adhesive agent (%) represents a ratio of the area occupied by the adhesive agent 61 with respect to the entire area of the operation surface (top surface) of the substrate 5.

The strange sound level (dB) is the volume of the strange sound emitted from the touch panel 4. The tactile sensation level (sensory evaluation) is the level of smooth tactile sensation experienced by a user, when the user operates the touch panel 4.

A higher tactile sensation level represents that a smoother tactile sensation is given to a user, and a lower tactile sensation level represents that a rough or irregular tactile sensation is given to the user.

When the ratio of the area occupied by the adhesive agent is higher, the touch panel 4 has a larger area to which the ultrasonic vibrations are directly communicated from the substrate 5 to the protection film 7 via the solidified adhesive agent 61. An increase in the ratio of the occupied area results in an increased area where the squeeze film A vibrates at a higher intensity. Therefore, the touch panel 4 can improve the tactile sensation level, and the smoother tactile sensation can be given to the user.

If the ratio of the area occupied by the adhesive agent is too high, however, the touch panel 4 approaches the structure of the touch panel 40 in which the adhesive agent 61 is provided to the entire surface of the substrate 5, as in the comparative example (see FIG. 2). Therefore, the strange sound level is increased. In the example illustrated in FIG. 5, when the ratio of the area occupied by the adhesive agent is increased to 80%, the strange sound reaches the highest tolerable strange sound level.

When the ratio of the area occupied by the adhesive agent is low, the touch panel 4 has a smaller area to which the ultrasonic vibrations are directly communicated from the substrate 5 to the protection film 7 via the solidified adhesive agent 61. When the ratio occupied by the area is low, the area where the squeeze film Aa vibrates at a lower intensity is increased in the touch panel 4. Therefore, the level of strange sound can be reduced.

If the ratio of the area of the touch panel 4 occupied by the adhesive agent is too low, however, a user will recognize the areas provided with the adhesive agent 61 and the area not provided with the adhesive agent 61 through the tactile sensation, when the user performs an operation of sliding the finger tip F across the touch panel 4, for example.

As a result, the user is given a rough tactile sensation or an irregular tactile sensation on the touch panel 4. In the example illustrated in FIG. 5, if the ratio of the area occupied by the adhesive agent is lowered to 20%, the tactile sensation reaches the lowest tolerable tactile sensation level.

Therefore, in the touch panel 4, the adhesive agent 61 is provided in a manner interspersed across the substrate 5 in such a manner that the adhesive agent occupies a ratio within the range of 30% to 70%, so that a tactile sensation higher than the lowest tolerable tactile sensation level and strange sound lower than the strange sound highest tolerable level are achieved. In this manner, the operation input device 1 can provide users with high-quality smooth tactile sensation, while reducing the strange sound caused by the vibration of the touch panel 4.

As described above, the operation input device 1 according to the first embodiment includes the substrate 5, the protection film 7, and the adhesive agent 61. The substrate 5 goes through ultrasonic vibrations, and receives touch input operations of users. The protection film 7 protects the operation surface of the substrate 5. The adhesive agent 61 is provided between the substrate 5 and the protection film 7, and provided in a manner interspersed across the substrate 5 in the plane direction of the operation surface, and the protection film 7 is bonded to the substrate 5 by the adhesive agent 61. In this manner, the operation input device 1 can suppress the generation of the strange sound caused by the vibration of the touch panel 4.

In the example explained in the first embodiment described above, each piece of the adhesive agent 61 has a square shape with the same size each side of which has a length of 1 millimeter or so, in the plan view, and these pieces are provided in a manner distributed evenly across the substrate 5, so that the air passage 62 is patterned in a grid-like shape having a constant pitch. However, this configuration is merely one example.

Each piece of the adhesive agent 61 may have a square shape each side of which has a sizes other than 1 millimeter in the plan view, or may have any polygonal shape other than a square shape in a plan view, or a circular or elliptical shape in a plan view. The size of each piece of the adhesive agent 61, in the plan view, does not necessarily need to be the same, as long as the image displayed on the display 2 appears as having a uniform transmittance as a whole, when users perceive the image through the touch panel 4.

For example, as the adhesive layer 6, pieces of the adhesive agent 61 having a plurality of different sizes may be arranged based on some regularity. For example, two different types of the adhesive agent 61, each type of which has a different size in the plan view, may be arranged alternatingly in the row direction and the column direction at an equal interval. With such an adhesive layer 6, too, the operation input device 1 enables the image displayed on the display 2 to appear as having a uniform transmittance as a whole, when users perceive the image through the touch panel 4.

In the same manner for the air passage 62, the air passage 62 does not need to have a grid-like shape, as long as the image displayed on the display 2 appears as having a uniform transmittance as a whole, when users perceive the image through the touch panel 4, and may have a mesh shape with a constant pitch, for example.

Second Embodiment

Figure 6:
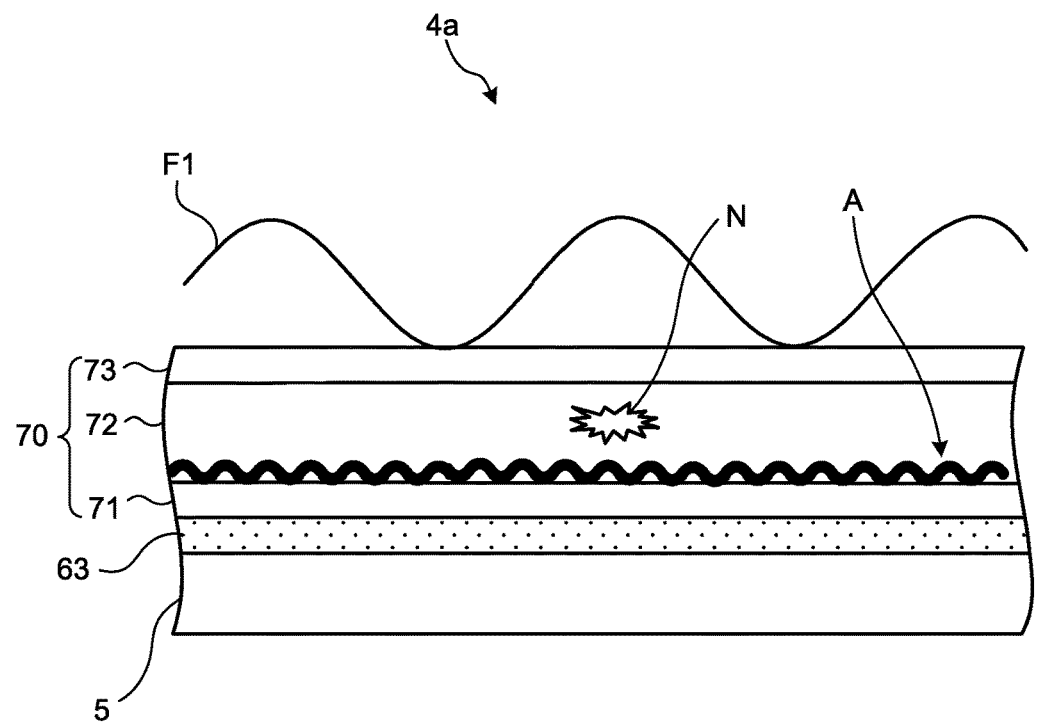
FIG. 6 is an explanatory schematic illustrating a part of a touch panel according to a second embodiment.

A touch panel according to a second embodiment will now be explained. As illustrated in FIG. 6, a touch panel 4*a* according to the second embodiment suppresses the generation of the strange sound N by providing a three-layer structure to a protection layer 70 that is disposed on the substrate 5 via an adhesive layer 63 covering the entire surface of the operation surface of the substrate 5.

Specifically, the protection layer 70 includes a first protection film 71 provided on the adhesive layer 63, and a second protection film 73 provided above the first protection film 71, with an air film 72 interposed therebetween. The second protection film 73 is laid over the first protection film 71 using adhesive agent that is provided around the edge of the top surface of the first protection film 71, for example.

The first protection film 71 and the second protection film 73 are made from a translucent adhesive agent such as PET, for example. In this manner, the touch panel 4*a* is provided with a three-layer structure including the first protection film 71, the air film 72, and the second protection film 73.

In such a touch panel 4*a*, when the substrate 5 goes through ultrasonic vibrations, the first protection film 71 is caused to go through ultrasonic vibrations, but because the air film 72 is present between the first protection film 71 and the second protection film 73, the second protection film 73 does not go through ultrasonic vibrations.

Therefore, in the touch panel 4*a*, when the substrate 5 goes through ultrasonic vibrations, the squeeze film A is formed on the surface of the first protection film 71. Therefore, the surface of the first protection film 71 is enabled to give a smooth tactile sensation.

In this manner, in the touch panel 4*a*, when a user slides the finger tip F across the second protection film 73 with the surface F1 of the finger tip F held thereto, the surface of the first protection film 71 can give a smooth tactile sensation to the surface F1 of the finger tip F of the user, via the second protection film 73.

At this time, in the touch panel 4*a*, the ultrasound waves emitted from the first protection film 71 going through ultrasonic vibrations resonate with the reflected waves of the ultrasound waves reflected on the second protection film 73 inside of the air film 72, and generate some strange sound N. However, the strange sound N generated in such an air film 72 is less recognizable by users, because the second protection film 73 serves as a filter.

As described above, because the protection layer 70 is provided with a three-layer structure including the first protection film 71, the air film 72, and the second protection film 73, the touch panel 4*a* can suppress the generation of the strange sound caused by the ultrasonic vibrations while giving a smooth tactile sensation to the user making a touch operation.

Furthermore, in the second embodiment, the strange sound N generated in the air film 72 can be further reduced by devising the shape of the surfaces of the first protection film 71 and the second protection film 73 facing each other in the touch panel 4*a* illustrated in FIG. 6.

Figure 7:
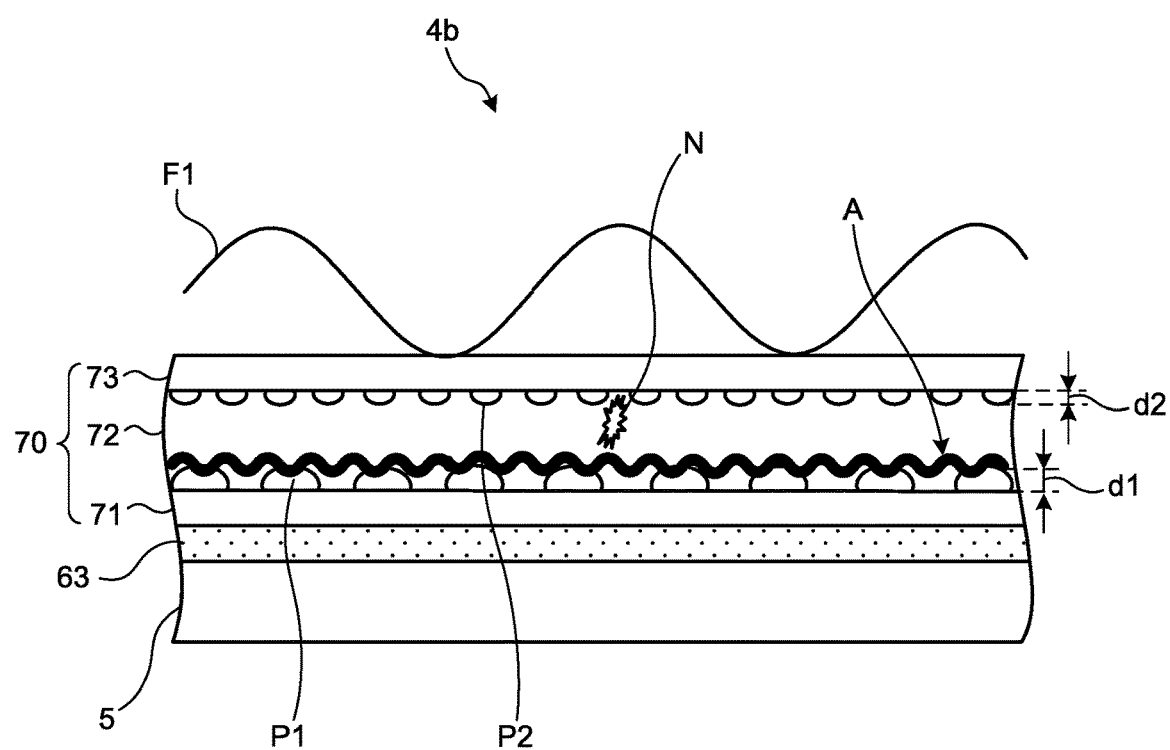
FIG. 7 is an explanatory schematic illustrating a part of a touch panel according to a modification of the second embodiment.

A touch panel 4*b* according to one modification in which the shapes of the surfaces of the first protection film 71 and the second protection film 73 are devised will now be explained with reference to FIG. 7. FIG. 7 is an explanatory schematic illustrating a part of the touch panel 4*b* according to the modification of the second embodiment. Among the element illustrated in FIG. 7, the elements that are the same as those illustrated in FIG. 6 will be given the same reference numerals as those illustrated in FIG. 6, and detailed explanations thereof will be omitted.

As illustrated in FIG. 7, a touch panel 4*b* according to the modification is different from the touch panel 4*a* illustrated in FIG. 6 in that bumps and recesses are provided to the top surface of the first protection film 71, and also to the bottom surface of the second protection film 73.

The bumps and the recesses on the first protection film 71 are formed by applying a solvent containing particles P1 having a predetermined size to the top surface of the first protection film 71, for example. A height difference d1 between the bumps and the recesses provided on the first protection film 71 will be explained later with reference to FIG. 8.

In this manner, because the first protection film 71 has the bumps and the recesses that are provided on the surface facing the air film 72, when the substrate 5 goes through ultrasonic vibrations, the particles P1 can scatter the directions in which the ultrasound waves emitted from the first protection film 71 are propagated.

In this manner, the touch panel 4*b* can lower the volume of the strange sound N generated by the resonance between the ultrasound waves emitted from the first protection film 71 and the reflected waves of the ultrasound waves reflected on the second protection film 73.

The bumps and the recesses on the second protection film 73 are formed by applying a solvent containing particles P2 having a predetermined size to the bottom surface of the second protection film 73, for example. A height difference d2 between the bumps and the recesses provided on the second protection film 73 will be explained later with reference to FIG. 9.

In this manner, because the second protection film 73 has the bumps and the recesses that are provided on the surface facing the air film 72, when the substrate 5 goes through ultrasonic vibrations, the particles P2 can scatter the directions in which the reflected waves reflected on the second protection film 73 are propagated.

In this manner, the touch panel 4*b* can lower the volume of the strange sound N generated by the resonance between the ultrasound waves emitted from the first protection film 71 and the reflected waves of the ultrasound waves reflected on the second protection film 73.

When the height difference (coarseness) between the bumps and the recesses formed on the first protection film 71 and the second protection film 73 is increased, the effect of strange sound reduction appears more prominent. However, if the height difference between the bumps and the recesses formed on the first protection film 71 and the second protection film 73 is too great, the touch panel 4b may give a user making a touch operation a rough tactile sensation or an irregular tactile sensation.

Therefore, in the touch panel 4b, the height difference between the bumps and the recesses formed on the first protection film 71 and the second protection film 73 is adjusted in such a manner that the generation of the strange sound caused by the ultrasonic vibrations is reduced, while giving a smooth tactile sensation to a user making a touch operation.

Figure 8:
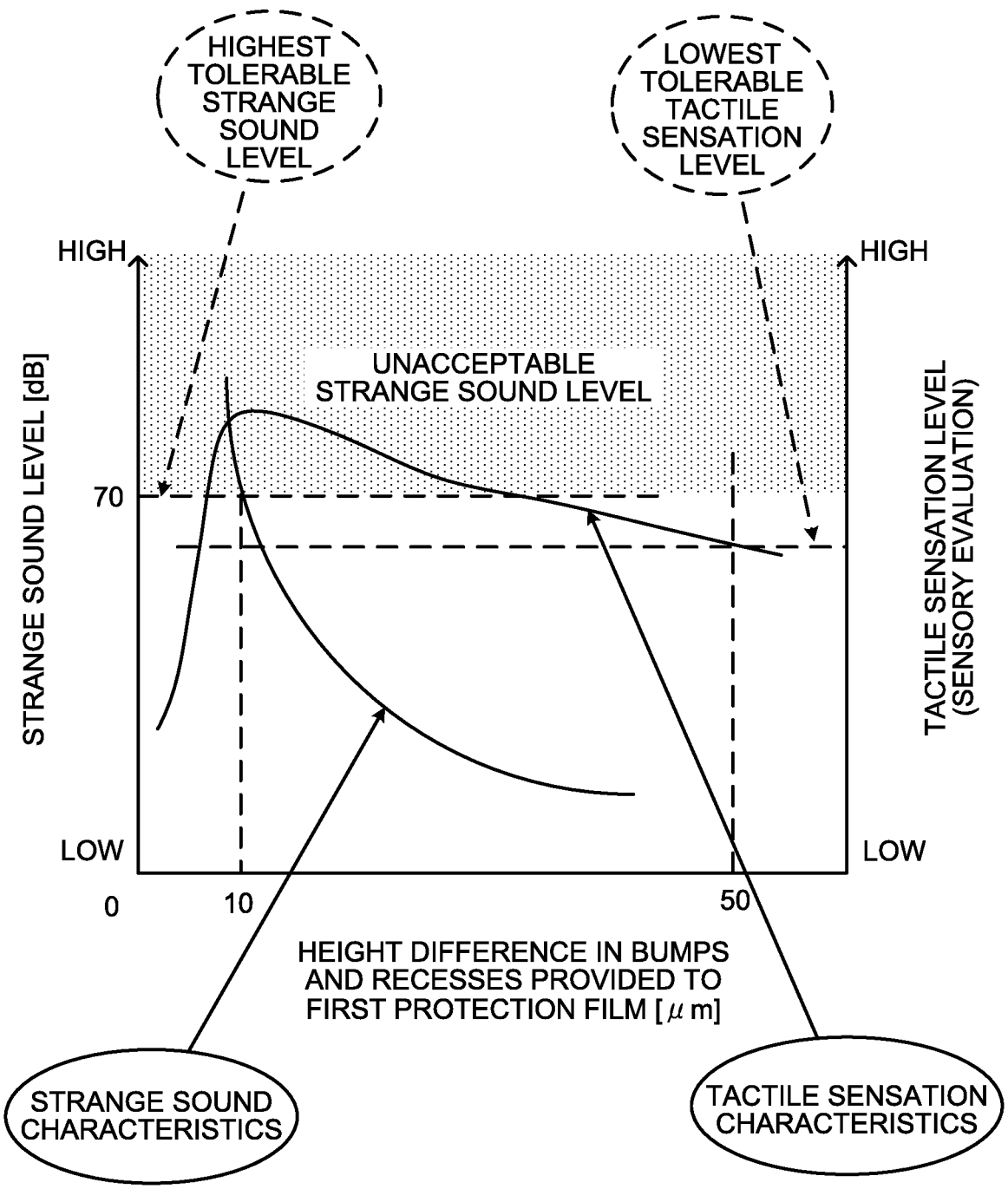
FIG. 8 is an explanatory schematic illustrating a relation between the height difference in bumps and recesses provided on a first protection film according to the second embodiment, and the levels of the strange sound and the tactile sensation.

The height difference between the bumps and the recesses formed on the first protection film 71 and the second protection film 73 will now be explained with reference to FIGS. 8 and 9. FIG. 8 is an explanatory schematic illustrating a relation between the height difference in the bumps and the recesses on the first protection film 71 according to the second embodiment, and the levels of the strange sound and the tactile sensation.

FIG. 9 is an explanatory schematic illustrating a relation between the height difference in the bumps and the recesses on the second protection film 73 according to the second embodiment, and the levels of the strange sound and the tactile sensation. The horizontal axes of the graphs illustrated in FIGS. 8 and 9 represent the height difference between the bumps and the recesses (micrometers). The vertical axes on the left side represent the strange sound level (dB), and the vertical axes on the right side represent the tactile sensation level (sensory evaluation).

The height difference between the bumps and the recesses (micrometers) represents the height difference d1 from the top surface of the first protection film 71 to the highest part of the particles P1 in FIG. 8, and the height difference d2 from the bottom surface of the second protection film 73 to the lowest part of the particles P2 in FIG. 9.

The strange sound level (dB) is the volume level of the strange sound emitted from the touch panel 4a. The tactile sensation level (sensory evaluation) is a level of smooth tactile sensation experienced by a user when the user operates the touch panel 4a.

When the tactile sensation level is higher, a user is given a smoother tactile sensation, and when the tactile sensation level is lower, the user is given a rough or irregular tactile sensation.

As illustrated in FIGS. 8 and 9, the strange sound has characteristics that the strange sound level is reduced when the height difference between the bumps and the recesses on the first protection film 71 or the second protection film 73 is increased. This is because, as explained earlier, when the height difference between the bumps and the recesses is greater, the propagating directions of the ultrasound waves or the reflected waves of the ultrasound waves are scattered more.

If the highest tolerable level of the strange sound is established as 70 (dB), for example, the height difference between the bumps and the recesses on the first protection film 71 or the second protection film 73 needs to be at least 10 (micrometers), as illustrated in FIGS. 8 and 9.

By contrast, the tactile sensation has characteristics that, as illustrated in FIGS. 8 and 9, the level of the tactile sensation is improved drastically as the height difference between the bumps and the recesses is increased from the minimum level, but the level of the tactile sensation then drops gradually, as the height difference between the bumps and the recesses is increased from a point where the height difference between the bumps and the recesses exceeds 10 (micrometers), for example.

Such characteristics of the tactile sensation can be considered as resultant of the frictional force that changes depending on the area in which the surface F1 of the finger tip F of the user is brought into contact with the second protection film 73. Specifically, when the user firmly presses the surface F1 of the finger tip F against the top surface of the second protection film 73, the second protection film 73 is bent in a manner protruding downwards, and is brought into contact with the first protection film 71. At this time, the shape of the surface of the second protection film 73 will follow the shape of the bumps and the recesses on the first protection film 71 and the second protection film 73.

Therefore, when the minimum height difference between the bumps and the recesses is used, that is, when the first protection film 71 and the second protection film 73 are almost completely flat, the area in which the surface F1 of the finger tip F of the user is brought into contact with the second protection film 73 is maximized, and therefore, the frictional force is increased. Hence, the tactile sensation level becomes minimum.

When the height difference between the bumps and the recesses is gradually increased, the area in which the surface F1 of the finger tip F of the user is brought into contact with the second protection film 73 is gradually reduced. Accordingly, the frictional force is reduced, so that the tactile sensation level is improved. However, if the height difference between the bumps and the recesses is too great, the user feels the bumps and the recesses on the first protection film 71 and the second protection film 73 prominently, and the level of the tactile sensation is gradually reduced.

Comparing the graph of tactile sensation characteristics illustrated in FIG. 8 with that illustrated in FIG. 9, in the first protection film 71 illustrated in FIG. 8, the tactile sensation level declines relatively moderately from the point where the elevations difference between the bumps and the recesses exceeds 10 (micrometers). By contrast, in the second protection film 73 illustrated in FIG. 9, the tactile sensation level drops relatively sharply from the point where the height difference between the bumps and the recesses exceeds 10 (micrometers).

This is because the users sense the change in the elevations between the bumps and the recesses on the second protection film 73 more sensitively than that in the elevations between the bumps and the recesses on the first protection film 71, because the users touch the second protection film 73 directly.

Users sense the bumps and the recesses on the first protection film 71 less, not only because the users touch the first protection film 71 indirectly via the second protection film 73, but also because the squeeze film A (see FIG. 7) is formed on the surface of the first protection film 71 by the ultrasonic vibrations of the substrate 5.

Based on the above, in order to keep the strange sound to a level equal to or less than the highest tolerable strange sound level, the lower boundary of the height difference between the bumps and the recesses on the first protection film 71 and the second protection film 73 both need to be set to 10 (micrometers).

However, in order to ensure some level of the tactile sensation, it is necessary to set the upper boundary of the height difference between the bumps and the recesses on the second protection film 73 to a level lower than the upper boundary of the first protection film 71. In other words, the upper boundary of the height difference between the bumps and the recesses on the first protection film 71 can be set higher than that set to the height difference between the bumps and the recesses on the second protection film 73.

Therefore, in the second embodiment, when the lowest level of tolerable tactile sensation is at the level illustrated in FIGS. 8 and 9, the height difference between the bumps and the recesses provided on the first protection film 71 is set to 10 (micrometers) to 50 (micrometers). By contrast, the height difference between the bumps and the recesses on the second protection film 73 is set to 10 (micrometers) to 20 (micrometers). In this manner, the operation input device 1 can keep the strange sound to a level equal to or lower than the highest tolerable strange sound level, and to keep the tactile sensation to a level equal to or higher than the lowest tolerable tactile sensation level.

As described above, the operation input device 1 according to the second embodiment includes the substrate 5, the first protection film 71, and the second protection film 73. The substrate 5 vibrates at an ultrasound frequency, and receives a touch input operation. The first protection film 71 is provided to the operation surface of the substrate 5. The second protection film 73 is provided to the first protection film 71 with the air film 72 interposed therebetween. In this manner, the operation input device 1 can suppress the generation of the strange sound caused by the vibration of the touch panel 4a.

In the second embodiment described above, the height difference in the bumps and the recesses provided on the first protection film 71 and the second protection film 73 are set in such a manner that the strange sound level becomes equal to or lower than the highest tolerable strange sound level, and the tactile sensation level becomes equal to or higher than the lowest tolerable tactile sensation level. This configuration is, however, merely one example.

In the operation input device 1, it is also possible to set the interval between the bumps or the width of the bumps provided to the first protection film 71 and the second protection film 73 in such a manner that the strange sound level becomes equal to or lower than the highest tolerable strange sound level, and the tactile sensation level is equal to or higher than the lowest tolerable tactile sensation level.

When such a configuration is used, the interval between the bumps or the width of the bumps are set by adjusting the size and the concentration of the particles P1, P2 that are provided to the solvent applied to form the bumps and the recesses on the first protection film 71 or the second protection film 73. With such a configuration, too, the operation input device 1 can provide users with high-quality smooth tactile sensation while reducing the strange sound caused by the vibration of the touch panel 4a.

The member provided on the first protection film 71 with the air film 72 interposed therebetween illustrated in FIG. 7 is not limited to the second protection film 73, and the member may be any member capable of preventing the finger tip F from touching the first protection film 71 directly.

Furthermore, explained in the first embodiment and the second embodiment described above is an exemplary operation input device 1 in which the touch panel 4, 4a, 4b is placed over the display 2. However, it is also possible to apply the touch panel 4, 4a, 4b according to the embodiments to any operation input device not provided with the display 2.

For example, when an operation input device is provided to the center console of a vehicle, and via which users control a target of control without looking at the operation surface, but with their senses through touch operations or sliding operations, such an operation input device is positioned nearer to the ears of the driver, compared with the operation input device provided to the dashboard of the vehicle.

Therefore, it is quite likely for the driver to respond sensitively to the strange sound emitted from the operation input device provided to the center console. Therefore, by applying the touch panel 4, 4a, 4b according to the first embodiment and the second embodiment to such an operation input device, comfort of the driver can be improved further.

In relation to the embodiments described above, the following aspects are disclosed.

(1) A touch panel including:
a substrate that vibrates at an ultrasound frequency, and that receives a touch input operation;
a protection film surface that is disposed on an operation surface of the substrate; and
an air passage pattern that is formed between the substrate and the protection film surface, and that is communicated with outside.

(2) An operation input device including:
a substrate that vibrates at an ultrasound frequency, and that receives a touch input operation; and
a protection film that is disposed on an operation surface of the substrate, wherein
the protection film has a surface that is provided with bumps and recesses, and forms an air film.

(3) An operation input device including:
a substrate that vibrates at an ultrasound frequency, and that receives a touch input operation;
a first protection film that is provided on an operation surface of the substrate; and
a second protection film that is provided on the first protection film with an air film interposed therebetween.

(4) The operation input device according to (3), wherein the first protection film has a surface that faces the air film and that is provided with bumps and recesses.

(5) The operation input device according to (4), wherein the bumps and the recesses provided on the first protection film have a height difference of 10 micrometers to 50 micrometers.

(6) The operation input device according to (3), wherein the second protection film has a surface that faces the air film and that is provided with bumps and recesses.

(7) The operation input device according to (6), wherein the bumps and the recesses provided on the second protection film have a height difference of 10 micrometers to 20 micrometers.

(8) A touch panel that is provided as an operation unit of an operation input device, the touch panel including:
a substrate that vibrates at an ultrasound frequency, and that receives a touch input operation;
a first protection film that is provided on an operation surface of the substrate; and
a second protection film that is provided on the first protection film with an air film interposed therebetween.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An operation input device comprising:
a substrate that vibrates at an ultrasound frequency, and that receives a touch input operation;

a protection film that is disposed on the substrate on a side of an operation surface; and an adhesive agent that is provided at a plurality of locations, the plurality of locations being separate from each other, between the substrate and the protection film while leaving an air gap between the plurality of locations, and by which the protection film is bonded to the substrate, wherein the adhesive agent and the plurality of locations are interspersed on the substrate in a plane direction of the substrate, and, in a top view of the operation input device, the adhesive agent is surrounded by the air gap at each of the plurality of locations.

2. The operation input device according to claim 1, wherein the adhesive agent is provided in an evenly distributed manner.

3. An operation input device comprising:

a substrate that vibrates at an ultrasound frequency, and that receives a touch input operation;

a protection film that is disposed on the substrate on a side of an operation surface;

an adhesive layer that is made from an adhesive agent that is provided at a plurality of locations, the plurality of locations being separate from each other, between the substrate and the protection film, and by which the protection film is bonded to the substrate; and an air passage that is patterned in the adhesive layer to leave an air gap between the separately provided plurality of locations of the adhesive agent, the air gap being opened to an outside of the adhesive layer, wherein the adhesive agent and the plurality of locations are interspersed on the substrate in a plane direction of the substrate, and, in a top view of the operation input device, the adhesive agent is surrounded by the air gap at each of the plurality of locations.

4. The operation input device according to claim 3, wherein the air passage is patterned in a mesh shape having a constant pitch.

5. An operation input device comprising:

a substrate that vibrates at an ultrasound frequency, and that receives a touch input operation;

a protection film that is disposed on the substrate on a side of an operation surface; and an adhesive agent that is provided at a plurality of locations between the substrate and the protection film, and by which the protection film is bonded to the substrate, wherein a ratio of an area occupied by the adhesive agent in the operation surface is 30% to 70% of an entire area of the operation surface.

6. A touch panel that is provided as an operation unit of an operation input device, the touch panel comprising:

a substrate that vibrates at an ultrasound frequency, and that receives a touch input operation;

a protection film that is disposed on the substrate on a side of an operation surface;

an adhesive layer that is made from an adhesive agent that is provided at a plurality of locations, the plurality of locations being separate from each other, between the substrate and the protection film while leaving an air gap between the plurality of locations, and by which the protection film is bonded to the substrate; and an air passage that is patterned in the adhesive layer to leave an air gap in the adhesive layer, the air gap being opened to an outside of the adhesive layer, wherein the adhesive agent and the plurality of locations interspersed on the substrate in a plane direction of the substrate, and, in a top view of the operation input device, the adhesive agent is surrounded by the air gap at each of the plurality of locations.

\* \* \* \* \*